United States Patent [19]

Sacco

[11] Patent Number: 4,823,826
[45] Date of Patent: Apr. 25, 1989

[54] PROCESS AND APPARATUS FOR INTRODUCING AQUEOUS CHLORIDE DIOXIDE INTO HIGH PRESSURE WATER INJECTION WELLS

[75] Inventor: Frank J. Sacco, Mission Viejo, Calif.

[73] Assignee: Pony Industries, Inc., New York, N.Y.

[21] Appl. No.: 944,794

[22] Filed: Dec. 22, 1986

[51] Int. Cl.⁴ .............................................. E21B 43/00
[52] U.S. Cl. ...................................... 137/1; 166/279; 166/310; 138/113
[58] Field of Search ..................... 137/1; 138/113, 114; 166/244.1, 275, 274, 279, 310, 246, 902

[56] References Cited

U.S. PATENT DOCUMENTS

| 4,033,381 | 7/1977 | Newman | 138/113 |
| 4,241,789 | 12/1980 | Grosch | 138/113 X |
| 4,454,917 | 6/1984 | Poston | 166/303 |
| 4,473,115 | 9/1984 | Oakes | 252/8.555 X |

Primary Examiner—Alan Cohan
Attorney, Agent, or Firm—Spensley Horn Jubas & Lubitz

[57] ABSTRACT

Apparatus for and method of introducing aqueous chlorine dioxide solution into a high pressure water-containing pipeline without causing corrosion of the pipeline.

13 Claims, 2 Drawing Sheets

PROCESS AND APPARATUS FOR INTRODUCING AQUEOUS CHLORIDE DIOXIDE INTO HIGH PRESSURE WATER INJECTION WELLS

BACKGROUND OF THE INVENTION

The present invention relates to high pressure water injection wells for secondary oil recovery and, more particularly, to a process and apparatus for efficiently treating high pressure injection wells to eliminate or minimize excessive material build-up and corrosion within the water injection lines.

The oil industry uses a variety of design techniques to maximize the recovery of oil from any particular oil formation. One of the methods so used is the injection of water under high pressure at a point removed from the site of the oil removal. Large amounts of water are injected under high pressure into the oil-producing sands. The injected water is removed at the oil well site along with the resident oil. Such treatment typically requires up to twenty parts of injection water per part oil recovered. Given this large amount of required water, oil producers utilize the nearest suitable source of water, which is often the water produced with the oil. Generally, such produced water contains a wide variety of impurities such as sulfur and sulfur compounds, and these impurities are often reinjected in the water injection well with the water.

The constant high volume flow of sulfur-containing and sulfur compound-containing water and the warm, incubator-like environment of oil field water treatment systems encourages the uncontrolled growth of bacteria—the source of many costly problems. The bacteria feed on the sulfur and the sulfur compounds thereby forming hydrogen sulfide and metallic sulfides. Bacterial growth, if left unchecked, causes, in addition to the formation of hydrogen sulfide, a toxic and corrosive gas that eats through piping in water and vapor recovery systems, the accumulation of gummy biomass that adheres to surfaces and filter media and substantially reduces equipment efficiency, and the formation of abrasive iron sulfide that wears injection pumps, decreases injectivity, fouls flow lines and causes corrosion; all of which increase operating costs and lower oil production. The build-up in the pipeline constricts the flow of water with the result that less oil is produced. If the water injection pipelines are not cleaned out periodically, they can become entirely obstructed.

Under the present state of the art, the commonly accepted procedure for cleaning out such water injection casings is to inject a mixture of hydrochloric acid and hydrofluoric acid into the water injection well. A typical mixture, commonly referred to as mud acid, contains 30% hydrochloric acid and 5% hydrofluoric acid. The hydrofluoric acid solubilizes the silicates and other sources of build-up, and the hydrochloric acid, by keeping the pH of the system low, keeps the material solubilized so that it can be washed out of the water injection well. This prior art method suffers from several problems. First, the hydrochloric/hydrofluoric mixture is highly corrosive and will corrode the metal walls of the water injection wells. In addition, such a mixture has little or no effect on any bacteria that may have built up. Such bacteria is often the primary obstructor. Finally, this method of clean-out is relatively expensive.

Attempts to control the growth of bacteria usually involves the use of biocides. The conventional biocides such as glutaraldehyde, acrolein, and quaternary amines are non-oxidizing compounds. They effectively kill bacteria by altering the permeability of the cell membrane of the microorganisms, thereby interfering with their vital life processes. The application of these products, however, does nothing for the plugging, fouling, deposits, and corrosion that have already been caused by the bacteria and bacterial by-products.

The present invention involves the use of the compound chlorine dioxide as a bactericide. Chlorine dioxide not only very effectively kills the bacteria but also oxidizes the hydrogen sulfide and metallic sulfides to relatively harmless and soluble sulfates. Typically, chlorine dioxide is produced in situ by reacting a precursor, such as sodium chlorate, with a reducing agent, such as sodium chloride, at very low pHs to produce chlorine dioxide. The method of producing chlorine dioxide forms no part of the present invention and any of the several conventional procedures can be employed. For a good review of the chemistry, physical properties, and use of chlorine dioxide, see Masschelein, W. J., "Chlorine Dioxide—Chemistry and Environmental Impact of Oxychlorine Compounds," Ann Arbor Science Publishers, Inc. (1979).

A major disadvantage of using chlorine dioxide is that it is inherently explosive; consequently, extensive controls on the reaction conditions and on the reaction effluent are required when using this compound. In the gaseous state, chlorine dioxide is explosive at concentrations above about ten percent in air. Given the explosive tendencies of chlorine dioxide, measures must be taken to prevent the occurrence of explosions, particularly in the vicinity of highly flammable hydrocarbons which are always present in oil fields. The present invention provides a method of using chlorine dioxide to minimize the growth of sulfur-feeding bacteria and the fouling caused by the waste products of such bacteria without encountering the explosive hazards usually attending the use of chlorine dioxide.

The present invention makes use of the fact that aqueous solutions of chlorine dioxide are not explosive, provided that there is no opportunity for chlorine dioxide to accumulate in any vapor space above the chlorine dioxide solution. This is prevented by maintaining the aqueous solution under a moderately high pressure in a system that does not contain vapor spaces. The high pressure system enables the water to dissolve more chlorine dioxide and also permits the aqueous solution to be injected into a water injection stream, which is generally maintained at pressures of 1000 psig or more.

Attempts to treat high pressure water injection wells with chlorine dioxide have been frustrated because chlorine dioxide and the strong acids usually used in the generation of chlorine dioxide are highly corrosive and severely attack most materials, including stainless steel. Stainless steel tubing has been tried, but it failed after a short period of time because of corrosion.

In low pressure chlorine dioxide treatments, the corrosivity problem can be avoided by the use of pipes and fittings made from fiberglass or plastic materials such as polyvinyl chloride or polyvinylidene fluoride. However, these materials are not always suitable for high pressure applications because tubing and fittings would have to be of considerable thickness. For instance, to provide adequate strength to withstand the high pressures required to inject chlorine dioxide solution into a high pressure injection water pipeline, the thickness of appropriate plastic tubing to carry the chlorine dioxide into the pipeline would prohibitively decrease the flow of injection water in the pipeline.

One family of metal alloys which are resistant to the corrosive effects of chlorine dioxide is nickel-chromium-molybdenum-colbalt alloy. These alloys are very costly, however, and no known attempts have been made to use them in high pressure chlorine dioxide applications.

SUMMARY OF THE INVENTION

The above-stated problems have been overcome, according to the present invention, by injecting aqueous chlorine dioxide into a high pressure water injection line by means of a hollow rod of tubing made from a metal alloy comprising, as the essential components, 60–75 weight percent nickel, 14–22 weight percent chromium, 12–15 weight percent molybdenum, and 1–4 weight percent cobalt. For convenience, these alloys in the stated concentration ranges are hereinafter referred to as NCMC alloys. Other metallic elements may be present in small amounts as impurities, but these are the essential components. Examples of suitable alloys are Hastelloy C-22 and Hastelloy C-276, trademarked products of Cabot Corporation. The rod of tubing, commonly referred to as a stinger, is centrally disposed along the longitudinal axis of the water injection line to minimize corrosive contact of the chlorine dioxide solution with the steel walls of the injection water line. The tubing itself is resistant to corrosion because NCMC alloys are not appreciably corroded by chlorine dioxide or the precursor acids which are used to prepare chlorine dioxide.

In a modification of the invention, the outlet end of the stinger is surrounded by a cylindrical open-ended sleeve, also made from an NCMC alloy. The sleeve serves to prevent the aqueous chlorine dioxide solution from contacting the water pipeline wall until it is diluted to a safe concentration by mixing with the main injection water stream. In accordance with a second modification, the sleeve ends are flared outwardly to provide increased turbulence to facilitate mixing of the aqueous chlorine dioxide solution and the injection water.

DETAILED DESCRIPTION OF THE PREFERRED EMBODIMENTS

Figure 1:
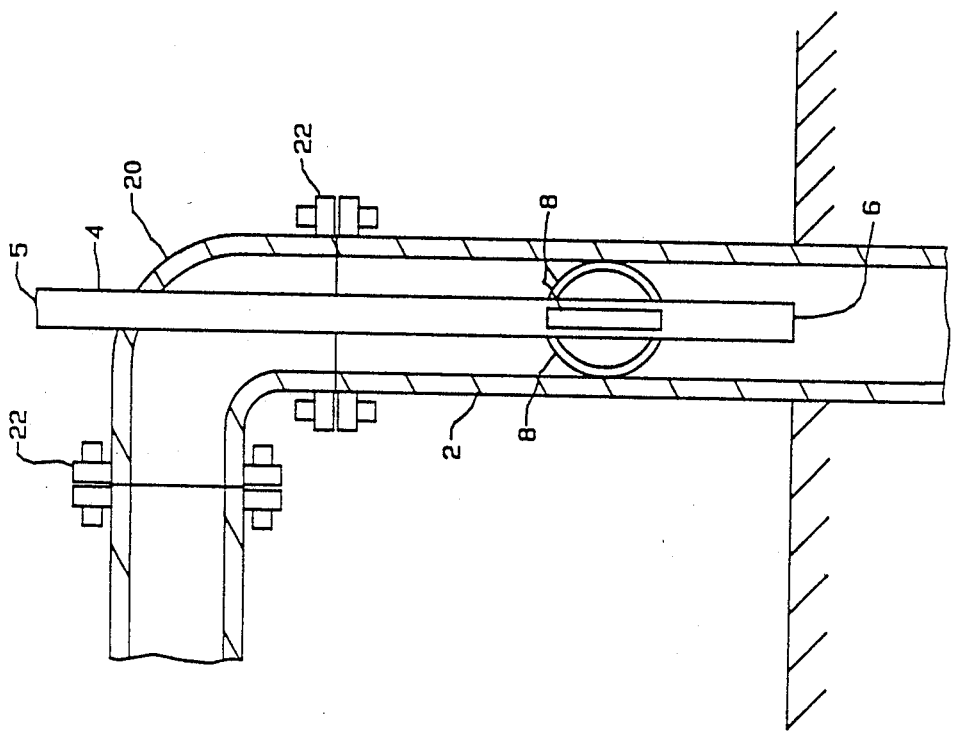
FIG. 1 is a sectional elevation view of a portion of a water injection well fitted with the stinger arrangement of the invention.

Considering the invention in more detail and with reference to the drawings, FIG. 1 shows a water injection well pipeline 2 which carries water into a subterranean oil field. A stinger tube 4 is fitted longitudinally into pipeline 2. Stinger 4 has an inlet end 5 adapted to be attached to a source of aqueous chlorine dioxide solution and a discharge end having an opening 6 from which aqueous chlorine dioxide solution is discharged into pipeline 2. Stinger 4 is fitted with spring members 8 which engage the inside wall of pipeline 2. It is preferred that stinger 4 be provided with three or more equally spaced spring members. Spring members 8 are adapted to hold the discharge end of stinger 4 radially in the center of pipeline 2 to minimize contact between the wall of pipeline 2 and the concentrated chlorine dioxide solution issuing from stinger outlet 6.

Figure 2:
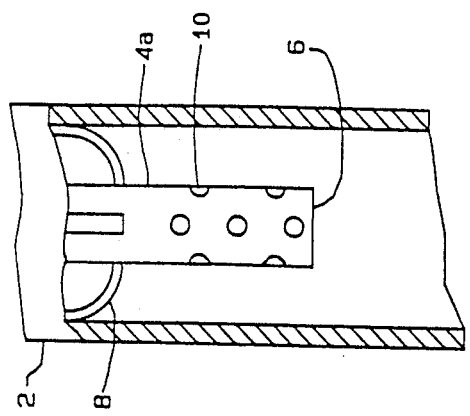
FIG. 2 is a fragmentary elevation view of the water injection line partly in section, illustrating a modification of the stinger.

FIG. 2 shows a modification of the stinger device used in the apparatus of FIG. 1. In this modification, the discharge end of stinger 4 has several openings 10 in the sidewall. The purpose of openings 10 is to permit several small streams of chlorine dioxide solution to issue from stinger 4, thereby increasing the rate of dispersion of the chlorine dioxide solution in the injection water and reducing any tendency of the chlorine dioxide to cause corrosion of the injection water pipeline wall.

Figure 4:
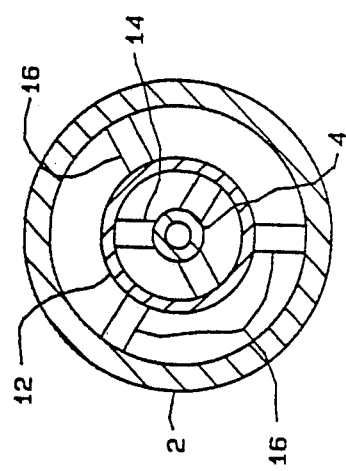
FIG. 4 is a cross-sectional view of the water injection line taken along the plane IV—IV of FIG. 3.
Figure 3:
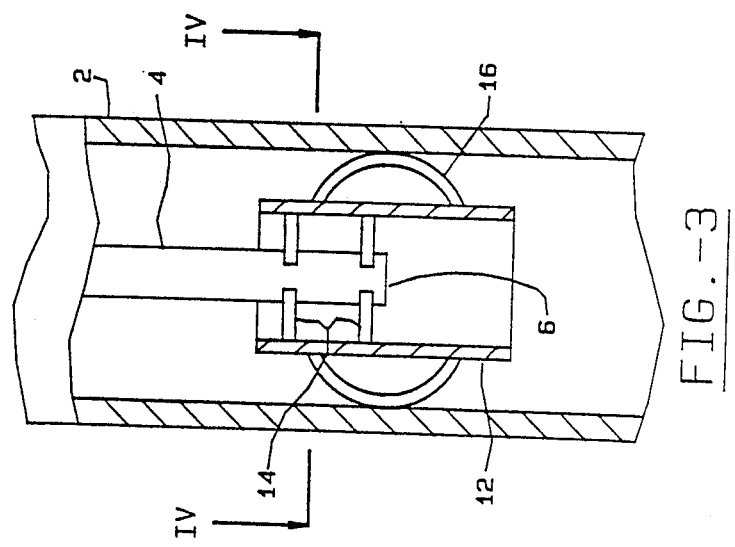
FIG. 3 is a fragmentary elevation view of a water injection line, partly in section, illustrating a stinger surrounded by a cylindrical sleeve.

FIGS. 3 and 4 illustrate another modification of the device shown in FIG. 1. In this embodiment, a cylindrical sleeve 12, made of NCMC alloy, is disposed concentrically around stinger 4 in a longitudinal direction with respect to pipeline 2. Sleeve, 12, which is disposed in spaced relationship with respect to stinger 4 may be fixed to stinger 4 by means of rigid support struts 14 (also made from NCMC alloy), as illustrated in FIG. 4. Alternatively, in an embodiment not shown, sleeve 12 may be fastened to the inner wall of pipeline 2 either by rigid support struts, in which case sleeve 12 will be in spaced relationship with the wall of pipeline 2, or by welding, press fitting, or other suitable fastening means, in which case there will be direct contact between the outer wall of sleeve 12 and the inner wall of pipeline 2 so that substantially no liquid flows therebetween. In the embodiment shown in FIGS. 3 and 4, sleeve 12 is centered by means of spring members 16 which press against the inner wall of pipeline 2.

Figure 5:
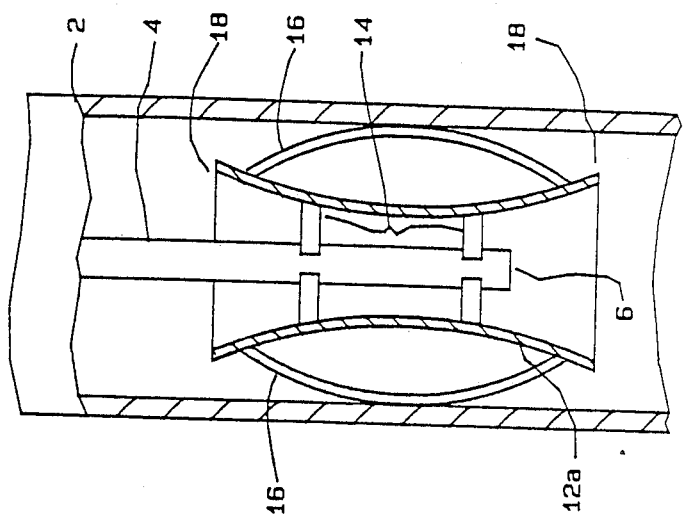
FIG. 5 is a fragmentary view of a water injection line, partly in section, illustrating a stinger surrounded by a cylindrical sleeve having flared ends.

In the embodiment shown in FIG. 5, sleeve 12 has outwardly flared ends 18. In this embodiment, greater turbulence is created in the region just downstream from the discharge end of stinger 4, thereby increasing the mixing efficiency of the aqueous chlorine dioxide and injection water streams.

The embodiments shown in FIGS. 3 and 5 are intended for use in situations where the mixing efficiency of the devices shown in FIGS. 1 and 2 is not great enough to prevent corrosion of the wall of pipeline 2 by the chlorine dioxide. The sleeves and all support struts and spring members can be made from NCMC alloy, if necessary, to resist the corrosive effects of the chlorine dioxide.

In operation, stinger 4 is placed inside of pipeline 2 by any suitable means. In FIG. 1, pipeline 2 has a removable elbow 20 which is fastened in place in the pipeline by flanges 22 to facilitate placement of stinger 4 in the pipeline. Stinger 4 is in sealing relationship with elbow 20 to prevent leakage of water from pipeline 2. Aqueous chlorine dioxide solution is discharged into pipeline 2 on a continuous or intermittent basis, as required. The devices illustrated in the drawings permit the chlorine dioxide stream to efficiently mix with the injection water stream in such a manner that corrosion of the pipeline wall is avoided or minimal.

It is understood that the drawings merely illustrate specific embodiments of the invention. The invention may take the form of other embodiments. For example, stinger 4 may be inserted in the pipeline with the discharge end pointing upstream or stinger 4 may be placed into a straight piece of pipeline, such as a spool, in which case the stinger will have a 90° bend. The invention is limited only by the scope of the appended claims.

What is claimed is:

1. A method of treating a high pressure water-containing line used for carrying water into a subterranean oil field so as to minimize clogging and corrosion of the pipeline, the method comprising the steps of:
providing a small diameter tube centrally disposed along the longitudinal axis of said line and having a discharge end provided with at least one opening to permit the effluence of an aqueous solution from said tube, said tube being made from an NCMC alloy;
introducing an aqueous chlorine dioxide solution into said tube; and
injecting the aqueous chlorine dioxide solution into the high pressure water-containing line.

2. The method of claim 1 wherein said tube is open ended.

3. The method of claim 1 wherein the sidewall of said discharge end is provided with at least one effluent opening.

4. The method of claim 1 wherein a cylindrical sleeve made of an NCMC alloy is disposed longitudinally in said line and concentrically around said discharge end and adapted to prevent the aqueous solution being discharged from said tube from contacting the interior wall of said line.

5. The method of claim 4 wherein said sleeve is fastened to said tube by means of rigid struts.

6. The method of claim 4 wherein said sleeve is fastened to the inner wall of pipeline 2 by rigid struts.

7. The method of claim 4 wherein the ends of said sleeve are flared outwardly.

8. In a system for carrying water into a subterranean oil field, an apparatus for injecting aqueous chlorine dioxide into a high pressure water-containing pipeline comprising a tube made from an NCMC alloy, the discharge end of which is open and located within the pipeline along its longitudinal axis and the other end of which is connected to a source of aqueous chlorine dioxide, so that aqueous chlorine dioxide introduced into the tube is injected into the pipeline and mixes with the water in the pipeline.

9. The apparatus of claim 8 wherein said discharge end of said tube is fitted with a plurality of spring members which are adapted to hold said discharge end in a centered relationship with respect to the longitudinal axis of the pipeline.

10. The apparatus of claim 8 in which the wall of said discharge end of said tube has at least one opening adapted to permit the effluence of aqueous chlorine dioxide.

11. The apparatus of claim 8 wherein a cylindrical sleeve, made from an NCMC alloy is concentrically fastened to the discharge end of said tube in spaced relationship thereto, said sleeve being adapted to promote mixing between chlorine dioxide solution issuing from said tube and a liquid stream in which said apparatus is placed.

12. The apparatus of claim 11 wherein the ends of said sleeve are outwardly radially flared.

13. Apparatus for treating a high pressure water injection pipeline of an oil field well to minimize clogging and corrosion within the pipeline, said apparatus comprising:
a source of aqueous chlorine dioxide; and
means for maintaining said aqueous chlorine dioxide in a liquid state and injecting said aqueous chlorine dioxide into the high pressure water injection pipeline, said means comprising:
a tube made from NCMC alloy having an inlet end for connection with said source and a discharge end located in said pipeline;
coupling means for coupling said tube to said pipeline; and
centering means for keeping the discharge end of said tube longitudinally centered in said pipeline.

* * * * *

UNITED STATES PATENT AND TRADEMARK OFFICE
CERTIFICATE OF CORRECTION

PATENT NO.   :   4,823,826

DATED        :   April 25, 1989

INVENTOR(S)  :   Frank J. Sacco

It is certified that error appears in the above-identified patent and that said Letters Patent is hereby corrected as shown below:

In the headnotes (cover page) title of invention should read
 -- PROCESS AND APPARATUS FOR INTRODUCING AQUEOUS CHLORINE
    DIOXIDE INTO HIGH PRESSURE WATER INJECTION WELLS -- .

Signed and Sealed this
Seventh Day of November, 1989

*Attest:*

JEFFREY M. SAMUELS

*Attesting Officer*   *Acting Commissioner of Patents and Trademarks*